INVENTOR
WILLIAM A. POWER
BY Maleson & Ratner
ATTORNEYS

INVENTOR
WILLIAM A. POWER
BY Malison + Ratner
ATTORNEYS

United States Patent Office 3,493,773
Patented Feb. 3, 1970

3,493,773
PROCESS VARIABILITY MONITOR SYSTEM
William A. Power, Willow Grove, Pa., assignor to Weston Instruments, Inc., Newark, N.J., a corporation of Delaware
Filed Mar. 20, 1967, Ser. No. 624,299
Int. Cl. G06m 7/00; H01j 39/12; G06g 7/18
U.S. Cl. 250—223
16 Claims

ABSTRACT OF THE DISCLOSURE

An instrumentation system for a process to provide the average of a plurality of sensed values of a single process variable in which each process value has a corresponding spaced analog signal. A read and hold circuit reads each analog signal and stores the value until the next spaced process value is sensed. An averaging circuit averages the value of the stored value for a constant time duration less than the time between sensing of adjacent process values and stores the resultant signal.

---

Figure 1:
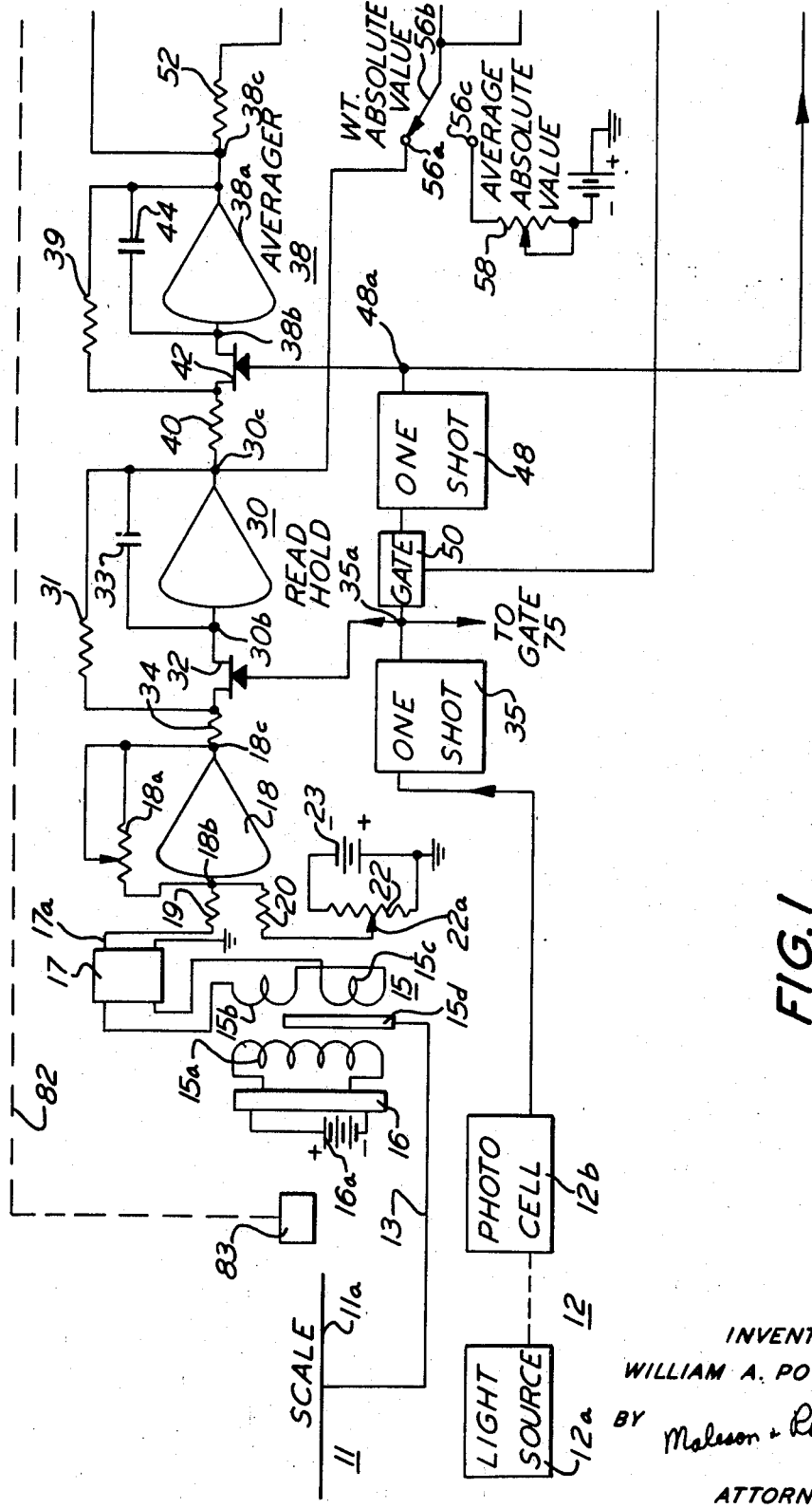

This invention pertains to the field of art of on-line statistical instrumentation for a process.

On-line or production line instrumentation has been used in many processes such as container filling systems in which each container is weighed as an entry after it has been filled. The measurement of the weight of each container entry is performed at a predetermined point on the production line with the entries being spaced with respect to time. The weight of containers on-line may be defined as a single variable of the process while the weight of each container as its weight is being entered may be defined as a value of the single process variable. In this manner individual measurements are made of a plurality of values of a single process variable with the values being spaced with respect to time. It will be understood that each value may be expressed as an individual analog signal.

Such instrumentation is required to provide qualitative information while the process proceeds continuously or discontinuously, that is with or without breaks in the entry of containers to be weighed. In addition, the entries may be spaced evenly or unevenly with respect to time. For example, containers to be weighed may be unevenly spaced on-line so that they are entered unevenly with respect to time and there may be a break in the process so that there is no container to be weighed for a substantial period of time. Prior production line instrumentation systems have used primary devices on-line to perform measurements of the process values such as weight, size, etc. By using these measurements prior instrumentation has performed basic computation. However, prior systems have left much to be desired in the performance of statistical computation in a complete system particularly where the process values may be continuous and discontinuous and where such values may be spaced evenly or unevenly with respect to time.

The requirements of complete instrumentation for a process may be explained with respect to a specific process in which containers are filled with a dry cereal, for example. In filling the boxes or containers there may be some conditions which cause the average of a plurality of weighings to drift away from a desired average. Further, there may be other conditions which cause the weight of a container to deviate substantially from the average independent of variation in the average.

For example, the dry cereal may be stored in a hopper which has a shutter which opens and allows the cereal to flow into a container for a predetermined duration. When there is more dry cereal in the hopper, more cereal flows into a container during the predetermined time duration. Thus, the running average value of the weight of the containers and the deviation of that running average with respect to a desired average setting is an important indication regarding the filling of the hopper. In another example, the shutter of the hopper may be faulty as a result of a loose timing cam. Thus, the shutter may remain open for a longer time duration at irregular intervals. Thus, the average of the container weights would not be affected but a deviation may be provided of a container weight with respect to an average value. If that deviation is larger than a desired maximum, the container is rejected. On the other hand, if the deviation is within normal limits the container is not rejected. In addition, the shutter may be becoming looser and looser with respect to time. Thus, the average of the foregoing deviation or mean deviation would show an increase with respect to time.

Accordingly, an object of the present invention is an instrumentation system for a process for providing the average of a plurality of values of a single process variable.

Another object of the present invention is an on-line instrumentation system for providing a deviation signal corresponding to the deviation of each process value from an average value.

In accordance with the present invention there is provided an instrumentation system for a plurality of values of a single process variable. The process values are sensed and corresponding spaced analog signals are generated with each of the analog signals being a function of a respective process value. A read and hold circuit produces measured signals each proportional in value to a corresponding analog signal with each measured signal being produced during a time duration no longer than the time of a process value sensing. In addition, the read and hold circuit stores the measured signal until the next spaced process value is sensed. An averaging circuit is utilized (1) for averaging the values of the stored signals with each of the stored signals being averaged for a predetermined constant time duration no longer than the time between sensing of adjacent process values and (2) and for thereafter storing the resultant averaged value signal until the next measured signal is averaged. In this manner, there is produced a running average of the process values whether the process values are continuous or discontinuous, evenly or unevenly spaced with respect to time.

Further, in accordance with the invention, an absolute deviation circuit is connected to the read and hold circuit and to the averaging circuit. The deviation circuit provides the absolute value of the difference between (1) the value of each of the stored measured signals and (2) the resultant averaged value signal. Thus, there is produced an absolute deviation signal corresponding to the absolute value of the deviation of each process value from an average value.

Figure 2:
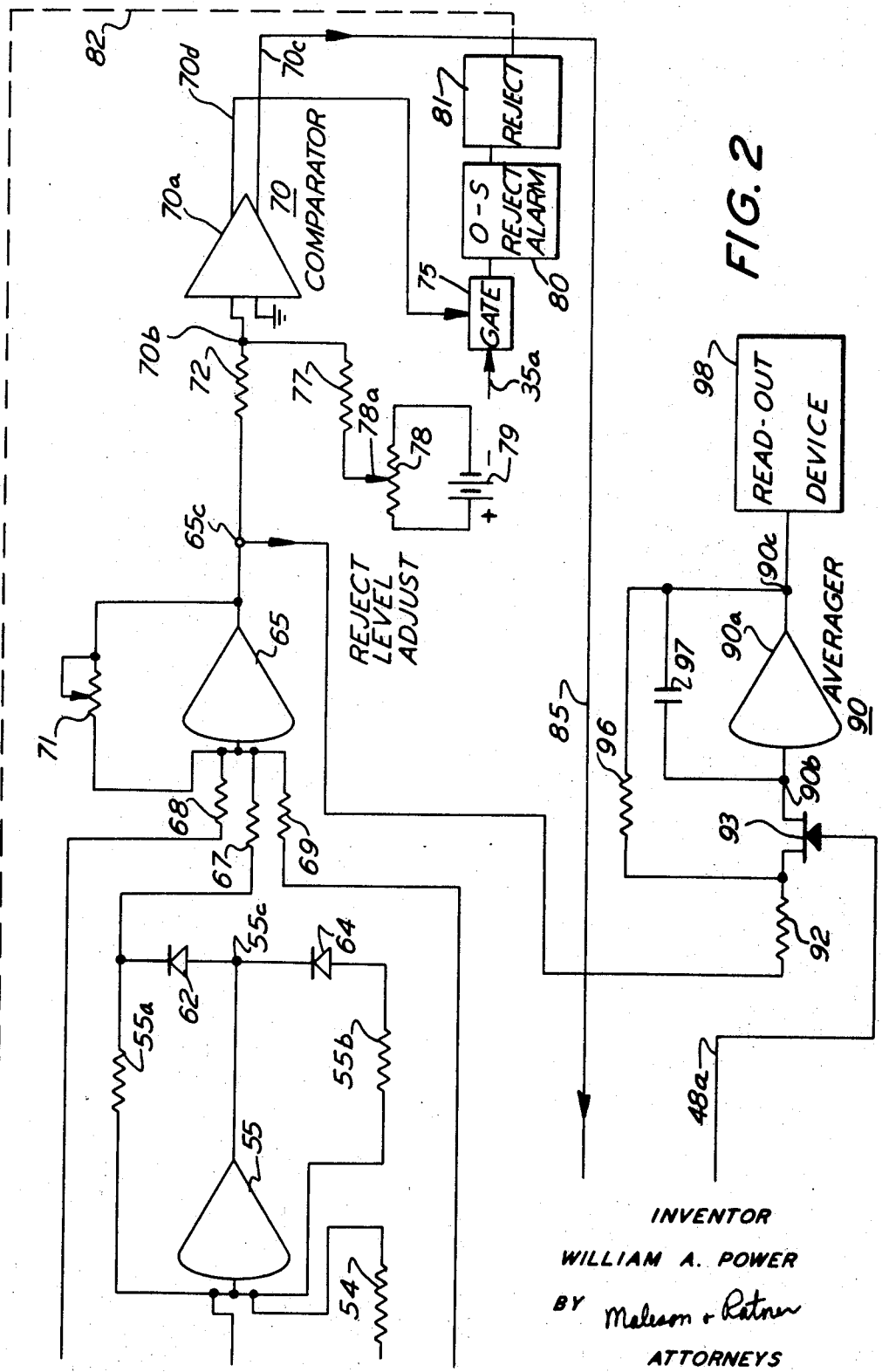
Figure 3:
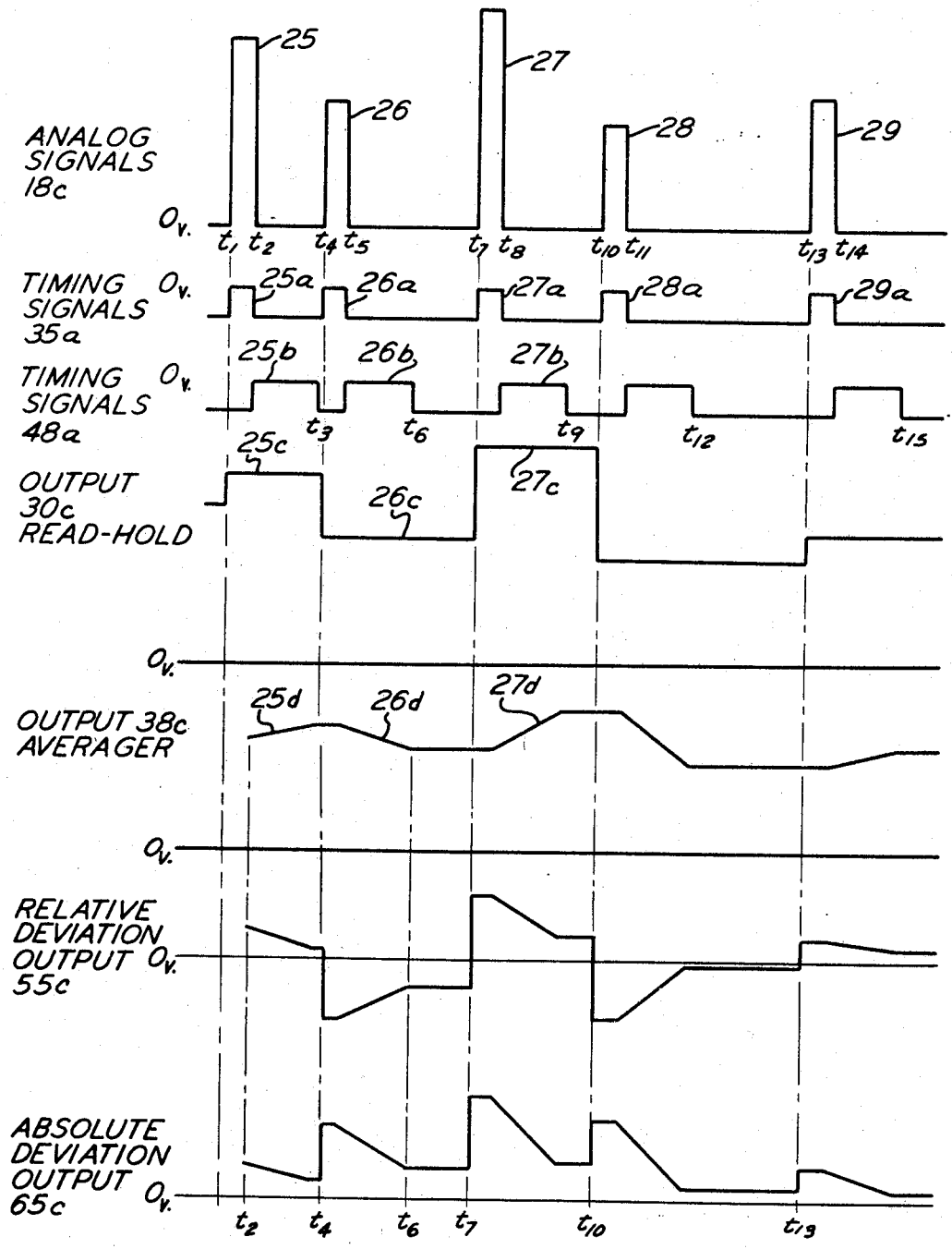

For further objects and advantages of the invention and for a description of its operation, reference is to be had to the following detailed description taken in conjunction with the accompanying drawings in which:

FIGS. 1 and 2 taken together illustrate an on-line statistical instrumentation system for a process embodying the invention, and FIG. 3 illustrates waveforms helpful in understanding the system of FIG. 1.

Referring now to FIGS. 1 and 2 there is shown an on-line statistical instrumentation system for a container filling process in which the containers may be cardboard boxes which are filled with a dry fill such as soap powder, cereal, etc. After each of the boxes is filled a conveyor belt brings the box to a weighing system 11 where it is weighed as an entry. Thus, the single process variable operated on by the instrumentation system is the weight of the boxes and it will be understood that the system may operate on other variables such as size of boxes, etc.

When a box is conveyed to weighing system 11 it is brought to a scale table 11a where it actuates a photocell system 12. System 12 comprises a light source 12a and a photocell 12b with the light source being directed across table 11a. In this manner, photocell system 12 produces an entry signal when a container is being weighed.

It will be understood that the container filling operation may be a continuous operation with the containers arriving at the weighing system 11 evenly with respect to time. On the other hand, the container filling operation or the speed of the conveyor belt may be such that the containers are normally entered on table 11a spaced unevenly with respect to time. In addition, the filling process may stop at times for reasons such as failures, shutdowns, etc., which causes a substantial break in the process. As a result, the process may then be defined as operating discontinuously.

In accordance with the invention whether the containers are evenly or unevenly spaced or whether the process is continuous or discontinuous, the system is effective to sense an entry at any time that a container is conveyed to scale table 11a. Table 11a is mechanically connected by way of a member 13 to a core 15d of a differential transformer 15. Transformer 15 comprises a primary winding 15a and two secondary windings 15b and 15c connected in series opposition. For the primary circuit a battery 16a is connected to an oscillator 16 which converts the D.C. input power to A.C. which is used to drive primary winding 15a. The axial position of core 15d determines the amount of voltage induced in secondary windings 15b and 15c which are connected to a full wave bridge and RC filter system 17. The secondary circuits are connected in series opposition so that the resultant output of system 17 is a D.C. voltage proportional to the displacement of core 15d from electrical center. Further, the polarity of the output voltage is a function of the location of the core 15d with respect to electrical center. Differential transformers are well known in the art and are generally described in an article by W. D. MacGeorge, "The Differential Transformer for Control Indication," Product Engineering 1953 Annual Handbook. A specific D.C. differential transformer is described in Sanborn, Division Hewlett-Packard, Series 7DCDT Brochure.

In the foregoing manner, the weight of a container is sensed and a D.C. voltage is generated at output 17a. In order to amplify the D.C. voltage it is applied by way of an input resistor 19 to a summing junction 18b of a preamplifier 18. Preamplifier 18 is an operational amplifier and includes an adjustable feedback resistor 18a connected between output 18c and summing junction 18b. In addition, summing junction 18b is also connected by way of a resistor 20 to a movable contact 22a of a potentiometer 22 having one side connected to the negative side of a battery 23 and the other side connected to the positive side thereof and to ground.

It will now be understood that the process values or weights of each of the containers is sensed by weighing system 11 and corresponding D.C. analog signals are generated by differential transformer 15. These spaced differing analog signals are amplified by preamplifier 18 and appear at output 18c as the waveforms shown in FIG. 3. As illustrated, a first of the analog signals 25 is produced between times $t_1$ and $t_2$, a second analog signal 26 is produced between times $t_4$ and $t_5$, a third analog signal 27 is produced between times $t_7$ and $t_8$, etc. It will be understood that the timing of each of the analog signals 25–28 corresponds to the sensing or weighing of its respective container. Accordingly, the time spacing between adjacent analog signals varies in accordance with the time spacing of the weighing of corresponding containers.

As previously described the containers may be evenly or unevenly spaced with the process proceeding continuously or discontinuously. Accordingly, for purposes of illustration, the time spacing between signals 25 and 26, viz, times $t_2–t_4$, is substantially less than the time spacing between signals 26 and 27, viz, times $t_5–t_7$. It will also be seen that the time spacing between signals 27 and 28 is different from the foregoing spacing and the spacing between signals 28 and 29 is of the longest time duration of those shown.

The output 18c of preamplifier 18 is connected to an input of a read and hold circuit 30 which is effective to read each of analog signals 25–29 for a predetermined time duration and then to store the value thereof. Specifically, read and hold circuit 30 comprises an operational amplifier 30a having a feedback resistor 31 and an input resistor 34. The input and feedback resistors are connected together at a junction to a source terminal of a field effect transistor 32, the drain terminal of which is connected to a summing junction 30b of operational amplifier 30a. A storage capacitor 33 is connected between summing junction 30b and the output 30c of operational amplifier 30a. Read and hold (also known as track and hold) circuits and operational amplifiers of the D.C. type are well known in the art and are described for example in a text by Korn and Korn, Electronic Analog and Hybrid Computers, McGraw-Hill Book Co., 1964, sections 10–4 and 1–9 et seq. respectively. Upon application of a zero or ground potential to a gate terminal of transistor 32, that transistor is effectively turned on and the analog signals at output 18c are applied to the summing junction 30b of amplifier 30a. If it is assumed that the input and feedback impedences of amplifier 30a, viz, resistors 31 and 34, are of equal value then circuit 30 has a gain of one and the signals at output 18c are produced of equal amplitude at output 30c. This output voltage at output 30c is defined as the measured value signal. When a negative going potential is applied to the gate terminal of transistor 32, that transistor is turned off and input feedback resistors 34 and 31 are effectively disconnected from summing junction 30b. Capacitor 33 is of capacitive valve to store the voltage of the measured signal at output 30c immediately prior to transistor 32 being switched to its off state. In this manner capacitor 33 reads or "tracks" the measured value signal and stores that last output value until transistor 32 is again turned on.

Each of the analog signals 25–29 only appears for a short discreet period of time, and it is important that the read cycle begins about the time of the start of an analog signal and the hold operation begin at or prior to the termination of the analog signal. For example, analog signal 25 begins at time $t_1$ and extends to and returns to zero potential at time $t_2$. Accordingly, the read operation may begin at or shortly subsequent to time $t_1$ and the hold operation may begin prior to time $t_2$. In other words, circuit 30 is required (1) to read for a time duration during but no longer than the time of a corresponding analog signal and (2) to store the measured value signal until the next spaced analog signal begins. Since the analog signals may be in time synchronism with the sensing of the container weights, the foregoing time durations may be based on the sensing in the following manner.

In order to provide the switching signals to transistor 32 there is provided a one-shot or monostable multivibrator 35 having input signals provided by photocell 12b. As previously described photocell 12b provides an entry signal at the time that a container is being weighed. Thus, at the time a container is entered on weighing system 11, one-shot 35 is switched from its stable state to its quasi-stable state and a positive going timing pulse 25a is applied by way of output 35a to turn on transistor 32. As well known by those skilled in the art the time duration of the quasi-stable state may be selected so that the time duration of the positive going pulse at output 35a terminates at time $t_2$ as shown in FIG. 3. With multivibrator 35 returned to its stable state at time $t_2$, output 35a produces a negative going signal which is effective to turn off transistor 32 and circuit 30 holds the measured signal stored in capacitor 33. The foregoing switching of multivibrator 35 is repeated for the next entry of a process value corresponding to analog signal 26 to provide a read and hold timing signal 26a at output 35a between times $t_4$ and $t_5$. In similar manner, for each subsequent entry a timing signal, 27a, 28a, 29a, etc., is produced at output 35a equal in time duration to the corresponding weighing time duration.

It will be understood that the foregoing timing signals 25a–29a each may be of less time duration than the time of sensing a corresponding process value but cannot be of longer time duration thereof. For example, a time delay may be necessary to allow time for a container to settle on the scale table 11a. Specifically, system 12 may delay the signal to one-shot 35 so that timing signal 25a begins only after analog signal 25 has stabilized in value. In this manner, signals 25a–29a are of less time duration, e.g. 25 percent less than the corresponding sensing time.

In accordance with the invention read hold circuit 30 carries the measured value signal past the time of a return to zero of the analog signal and until the next spaced process value is sensed which provides a new input to circuit 30. In this manner, the measured values are held at output 30c independent of the spacing and continuity of the entries.

Output 30c of read hold circuit 30 is applied to an averaging circuit 38 which comprises an operational amplifier 38a having a feedback resistor 39 and an input resistor 40. The common connection of resistors 39 and 40 is connected to a source terminal of a field effect transistor 42 the drain terminal of which is connected to the summing junction 38b of amplifier 38a. An averaging or integrating capacitor 44 is connected between summing junction 38b and an output 38c of amplifier 38a. It will be understood that the structure of averager 38 is substantially similar to that of read hold circuit 30 except that capacitor 44 is of relatively large capacitive value so that circuit 38 averages the applied signals while capacitor 33 is of substantially small capacitive value so that circuit 30 quickly tracks the applied signals. Such averaging or integrating circuits are well known in the art and are described in the cited Korn and Korn text at section 1–12 et seq.

More particularly, averager 38 is effective to average the values of the stored measured signals for a predetermined constant time duration less than the time between sensing of adjacent analog signals or process values. Specifically, timing signals for averager 38 are produced as follows. The output 35a of one-shot 35 is also connected by way of a gate 50 to an input of a one-shot 48. Gate 50 is normally enabled to pass signals from output 35a to one-shot 48 in a manner later to be described.

One-shot 48 has a quasi-stable state of substantially longer time duration than one-shot 35. For example, one-shot 48 may have a quasi-stable state of 40 milliseconds while one-shot 35 may have a quasi-stable state of 10 milliseconds. Monostable multivibrators and their operation to vary the time of the quasi-stable state are described in Millman and Taub, Pulse, Digital and Switching Waveforms, McGraw-Hill, 1965, at p. 405 et seq. Accordingly, when one-shot 35 switches from its quasi-stable to its stable state an input signal is applied to one-shot 48 which is effective to switch that one-shot to its quasi-stable state thereby to provide a positive going output signal at output terminal 48a.

Accordingly, a positive going averaging timing signal is produced at output 48a at the termination of a timing signal at output 35a. For example, at time $t_2$ timing signal 25a terminates and timing signal 25b begins and extends until time $t_3$ which is determined by the constant time duration of the quasi-stable state of one-shot 48. Thus, the held output potential 25c at output 30c is averaged between times $t_2$ and $t_3$ (an averaging timing signal) as shown in FIG. 3 to produce potential 25d. The slope of potential 25d slowly rises to indicate a slow increase in the charge of capacitor 44 from its previous value. In a preferred embodiment the time constant of averager 38 is selected so that it approaches the time of from ten to twenty averagings of the measured value signals each over the constant averaging time of an averaging timing signal, viz, times $t_2$–$t_3$, $t_5$–$t_6$, $t_8$–$t_9$, etc. For the purposes of illustration the slope of each of the averaged value signals 25d, 26d, 27d, etc., is shown to have a greater slope than in practice.

It will now be understood that averager 38 averages the value of the stored signal at output 30c for a predetermined constant time duration and provides equal weighting to each data entry. At the termination of each sampling, transistor 42 is turned off and the resultant averaged value signal is maintained stored on capacitor 44 between output 38c and ground. As shown in FIG. 3 the resultant averaged value signal 25d is held at output 38c between times $t_3$–$t_4$. At time $t_4$ output 38c produces a negative going direction slope 26d as a result of the lower valued potential being held at output 30c.

More particularly the timing signal applied to averager 38 is required to have a constant time duration no longer than the minimum spacing between entries of containers being weighed or the minimum spacing between analog signals. Thus, in a preferred embodiment the averaging of the measured value signal beings at about the time the read hold circuit 30 is switched to its hold state and extends for a constant time duration no longer than the beginning of a subsequent read cycle of circuit 30. Averaging does not extend into the time of a read cycle of circuit 30 for the reason that an entry may be grossly in error. Thus, for example, a container may not have been filled, and therefore such an out of range deviation from average should not be applied as an input signal to averager 38. As will later be described in detail, in the foregoing situation a reject signal is applied during the read cycle to gate 50 thereby to disable the gate and prevent averager 38 from averaging the out of range signal.

As previously described, the time constant of averaging circuit 38 is selected to provide a sample over the prior ten to twenty entries of process values (X) to provide a resultant averaged value signal ($\overline{X}$) which indicates how the process values are tending to run. In this manner a "running average" is provided which is weighted towards the last bit of information and weighted less towards the previous input signals going back in time. The time constant or averaging time cannot be of too long a time duration as to remember process values from the beginning of the process since such a running average would not tell where the process is tending. On the other hand, the time constant cannot be too short as the resultant averaged signal would merely be the average of each process value and not a running average.

With a running average obtained at terminal 38c, that value may be compared with each held measured signal at output 30c to provide a deviation signal corresponding to the deviation of each process value from an average value. Thus, output terminal 38c is connected by way of an input resistor 52 to a summing amplifier 55 and output 30c is connected by way of a fixed contact 56a, movable contact 56b, input resistor 54 to amplifier 55. In addition, the running average may be compared with a desired average value setting which is provided at a fixed terminal 56c. Accordingly, contact 56b may be shifted to engage contact 56c and a desired average setting is produced by varying potentiometer 58 which is connected between contact 56c and the negative side of a battery 59, the positive side of which is connected to ground.

Thus, with contact 56b engaging contact 56c a boundary may be set on the deviation of the average of the process values. In this manner the running average may be controlled. With contact 56b engaging 56a each process value may be compared with a controlled running average to determine how far each entry is from the average.

Amplifier 55 may be an operational amplifier having an output 55c connected by way of the anode and cathode of a diode 62, a feedback resistor 55a to the summing junction of amplifier 55. In addition, output 55c is connected by way of a cathode and anode of a diode 64, a feedback resistor 55b to the summing junction. As a result of amplifier inversion, the averaged signal at output 38c is inverted with respect to the measured signal at output 30c. Thus, with input resistors 52 and 54 and feedback resistors 55a and 55b all having equal values of resistance then output 55c provides the relative difference between the averaged signal and the held measured signal as shown in FIG. 3.

In order to provide the absolute value of the foregoing difference signal amplifier 55 has a pair of feedback circuits which include diodes 62 and 64 and an additional amplifier 65 is provided. These circuit elements are connected in a manner well known in the art. Specifically, the cathode of diode 62 is connected by way of an input resistor 67 to the summing junction of amplifier 65, output 38c is connected by way of an input resistor 68 to the summing junction and contact 56b is connected by way of an input resistor 69 to the summing junction. In addition a feedback resistor 71 is connected between the summing junction and an output 65c of amplifier 65. Resistors 68, 69 and 71 are each of equal resistance value and input resistor 67 is selected to be of one-half that resistance value. Thus, the deviation signal produced at output 65c is the absolute value of the difference of the signals at output 38c and contact 56b with the absolute deviation signal, $|X-\overline{X}|$, being illustrated in FIG. 3.

Absolute value circuits are well known in the art and are described for example in the above cited text by Korn and Korn at section 9–2 et seq. The operation of the absolute deviation circuitry may be shown by assuming a first example in which the relative difference of the input signals applied to amplifier 55 is +10 volts and a second example in which the relative difference is −10 volts. In the first example with an inversion by amplifier 55, the output signal at output 55c is −10 volts which is fed pack by way of conductive diode 64 but is not applied to amplifier 65 by nonconductive diode 62. The input signals are also applied to the summing junction of amplifier 65 and produce at output 65c a −10 volt resultant signal. In the second example with a relative difference of −10 volts, a +10 volt signal is produced at output 55c which is applied by way of diode 62 to input resistor 67. Accordingly, that signal appears as a −20 volt output at output 65c. However, the input signals are also applied by way of resistors 68 and 69 to the summing junction so that the resultant output signal at output 65c is −10 volts. Thus, in both examples for relative differences of +10 volts and −10 volts the absolute difference is −10 volts.

It will now be understood that in accordance with the invention with contact 56b in its illustrated position there is provided at output 65c the absolute value of the difference between (1) the value of each of the stored measured signals at output 30c and (2) the resultant averaged value signal of averaging means 38 to produce an absolute deviation signal shown in FIG. 3. This absolute deviation signal corresponds to the absolute value of the deviation of each process value from the running average. In this manner, the absolute deviation signal at output 65c indicates for each entry the absolute value of how far that entry is from an average value. This signal indicates the spread of each entry from an average.

On the other hand, with contact 56b engaging contact 56c, output 65c provides the absolute value of the difference between the averaged value signal and a desired average setting. Thus, there is produced an absolute deviation signal corresponding to the absolute value of the deviation of the running average of the process values from a desired average setting. In this manner, the deviation signal at output 65c indicates the trend of the process compared with a desired setting.

In order to compare either of the foregoing absolute deviation signals with a selected reject level there is provided a comparator circuit 70, a gate 75, a reject alarm 80, and a reject operator 81. Specifically, comparator circuit 70 comprises a differential amplifier 70a having a pair of inputs and a pair of differential outputs 70c and 70d. Output 65c is connected by way of an input resistor 72 to a first of the differential inputs 70b and the other differential input is grounded. In addition, input 70b is connected by way of an additional input resistor 77 to a movable contact 78a of a potentiometer 78 the fixed ends of which are connected across a battery 79.

With contact 56b in its illustrated position, contact 78a may be adjusted to provide a voltage setting proportional to a reject level. Any deviation signals of magnitude greater than such reject level are considered out of range. Normally, when the absolute deviation signal at output 65c is less than the selected reject voltage, a positive going potential is produced at output 70c which is applied by way of conductor 85 to a gating input of gate 50. In this manner, gate 50 is normally enabled thereby allowing pulses from one-shot 35 to be applied to one-shot 48. Specifically, the switching of one-shot 35 from a quasi-stable to a stable state actuates one-shot 48. In addition, a negative going potential is normally produced at output 70d which is applied as a disabling signal to a gating input of gate 75.

On the other hand, when the absolute deviation signal at output 65c is greater in magnitude than the selected reject voltage then effective "reject signals" are produced at the differential outputs. Specifically, output 70c provides a reject negative going potential to disable gate 50 which prevents one-shot 35 from actuating one-shot 48. Thus, timing signals are no longer applied to averager 38 during the time duration of the reject signal from comparator 70. In this manner, the measured value signal being held by circuit 30 corresponding to an out of range process value is not averaged by averager 38. Thus, there is avoided adversely effecting the running average. It will now be understood that the timing of averager 38 is preferably selected to be between read cycles of circuit 30 thereby to avoid averaging out of range signals which are rejected by comparator 70.

At the same time that a reject negative going signal is produced at output 70c, a reject positive going signal is provided at output 70d which is effective to enable gate 75 and allow the positive going timing pulse at output 35a to be applied to an input of a one-shot alarm circuit 80. In this manner, circuit 80 is switched from its stable to its quasi-stable state which produces an energizing signal to a reject operator 81. Operator 81 may comprise a solenoid which actuates, by way of a member 82, a plunger 83 to remove an out of range container from a conveyer belt.

For example, a container may be entered having a weight which is out of range of the desired weight. Thus, a deviation signal is produced of greater magnitude than the selected reject voltage. Accordingly, gate 50 is disabled and gate 75 is enabled thereby to avoid averaging the out of range signal and to actuate reject operator 81 to remove the container from the line.

Comparator 70, alarm 80 and reject operator 81 may also be utilized when switch 56b engages contact 56c in order to set a boundary on the average of the process values. Accordingly, reject potentiometer 78 is adjusted to a desired boundary value. When that value is exceeded by the difference between the average and the desired average then gate 75 is enabled. Accordingly, each subsequent return of one-shot 35 from a quasi-stable to a stable state is effective to remove a container from the line. The alarm alerts the operator to stop the line and determine the problem in the process and make a correction to prevent the average from exceeding the desired boundary. In addition, averager 38 must be reset since the error average is being held by capacitor 44.

The trend of the deviation of the process values from the average value, defined as the mean deviation ($|\overline{X-X}|$) is provided by averaging circuit 90. As previously described with switch 56b in its illustrated position output 65c produces an absolute deviation signal corresponding to the absolute value of the deviation of each process value from an average value. This signal is applied by way of an input resistor 92 and a source and a drain terminal of a field effect transistor 93 to a summing junction 90b of an operational amplifier 90a of averager 90. A feedback resistor 96 is connected between an output 90c of amplifier 90a and the source terminal of transistor 93. In addition, an integrating capacitor 97 is connected between output 90c and summing junction 90b.

The gate terminal of transistor 93 is connected to output 48a of one-shot 48 so that averager 90 averages in synchronism with averager 38 and does not average out of range values. Output 90c is applied to a read-out device 98 which may be a recorder which provides a permanent record of the mean deviation. It will be understood that as the process continues, read-out device 98 indicates how far the individual entries of container weight are spread. Thus, the mean deviation shows how well the process is going with an increase in the mean deviation indicating a worse process. An operator would then attempt to find the fault in the process and correct it.

It will be understood by those skilled in the art that the above described detailed embodiment is meant to be merely exemplary and that it is susceptible of modification and variation without departing from the spirit and scope of the invention. For example, it may be desirable to utilize two identical system channels (1) one of which provides the absolute value of the deviation of each process value from the average and (2) the other of which provides the absolute value of the deviation of the average from a desired average. In this manner, both absolute deviation signals may be simultaneously generated and there is avoided the use of switch contact 56b. Both of such channels may include substantially identical structure or it may be desired in the channel generating deviation of average from desired average to avoid the use of the comparator and alarm structure. In that event, output 65c would be applied to a readout device to provide for a permanent record of the absolute deviation of average from desired.

Further, the timing signals for read hold and averaging may be generated by the analog signals rather than by system 12. Specifically the initiation and termination of analog signals 25–29 may be used to directly generate such timing signals thereby to avoid any error is the analog signals are time delays with respect to the weighing operation.

What is claimed is:
1. A system for providing the average and deviation from average of a plurality of values of a single process variable with said process values being sensed at spaced differing times comprising
   means for sensing said process values and for generating corresponding spaced analog signals each of which is a function of a respective process value,
   read and hold means connected to said sensing means (1) to produce measured signals each proportional in magnitude to a corresponding analog signal with each measured signal being produced during a time duration no longer than the time of said sensing of a process value and (2) to store said measured signal until the next spaced process value is sensed,
   averaging means connected to an output of said read and hold means (1) for averaging the values of said stored measured signals with each of said stored signals being averaged for a predetermined constant time duration no longer than the time between sensing of adjacent process values and (2) for thereafter storing the resultant averaged value signal until the next measured signal is averaged, and
   means connected to said read and hold means and said averaging means for providing the absolute value of the difference between (1) the value of each of said stored measured signals and (2) said resultant averaged value signal of said averaging means to produce an absolute deviation signal corresponding to the absolute value of the deviation of each process value from an average value.

2. The system of claim 1 in which there is provided setting means for producing a predetermined value signal corresponding to a desired average process value,
   switch means for selectively disconnecting said read and hold means from said absolute value means and connecting said setting means thereto whereby said absolute value means provides the difference between (1) said predetermined value signal and (2) said resultant averaged value signal of said averaging means to produce an absolute deviation signal corresponding to the absolute value of the deviation of the average of the process values from a desired average.

3. The system of claim 1 in which there is provided means for producing a predetermined value signal proportional to a reject level,
   comparator means connected to said reject level means and to said absolute value means for providing a reject signal when said absolute deviation signal is greater in magnitude than said reject level.

4. The system of claim 1 in which there is provided additional averaging means connected to an output of said absolute value means (1) for averaging the values of said absolute deviation signals with each of said deviation signals being averaged for said predetermined constant time duration and (2) for thereafter storing the resultant averaged deviation signals until the next deviation signal is averaged thereby to provide a mean deviation signal corresponding to the trend of the deviation of said process values from said average value.

5. The system of claim 4 in which said additional averaging means comprises an amplifier having a feedback integrating capacitor and a switching device connected between said amplifier and said absolute value means and timing means connected to said device for turning on said device only during said predetermined constant time duration.

6. The system of claim 3 in which the weight of containers on a production line is said single variable of a process and said sensing means is a weighing system for generating spaced analog signals each of which is a function of a respective container weight and means for removing a container being weighed from said line when a reject signal is produced.

7. An instrumentation system for a plurality of values of a single process variable in which there is a corresponding spaced analog signal for each process value comprising
   read and hold means having said analog signals applied thereto and switchable (1) to a read state to produce measured value signals each proportional in value to a corresponding analog signal upon application of a first timing signal and (2) to a hold state to store said measured signal upon termination of a first timing signal,
   averaging means connected to an output of said read and hold means and switchable (1) to an averaging state upon application of a second timing signal for averaging the values of said stored measured signals to produce a resultant running averaged value signal and (2) to a hold state for storing said resultant averaged signal upon termination of a second timing signal, means connected to said read and hold means and to said averaging means for providing the absolute value of the difference between (1) the value of each stored measured signal and (2) said resultant averaged value signal to produce an absolute deviation signal corresponding to the absolute value of the deviation of each process value from an average value, timing means for producing (1) first timing signals each having a time duration no longer than the time duration of an analog signal and (2) second timing signals having a time duration no longer than the smallest interval between analog signals, and means for applying said first timing signals to said read and hold means and for applying said second timing signals to said averaging means.

8. The system of claim 7 in which there is provided setting means for producing a signal corresponding to a predetermined average process value, and switch means for selectively disconnecting said read and hold means from said absolute value means and for connecting said setting means thereto whereby said absolute value means provides an absolute deviation signal corresponding to the absolute value of the deviation of the average of the process values from a desired average.

9. The system of claim 8 in which there is provided means for producing a predetermined value reject level signal, and out of range comparator means connected to said reject level means and to said absolute value means for providing at a comparator output a reject signal when said absolute deviation signal is greater in magnitude than said reject level.

10. The system of claim 9 in which there is provided means for gating said timing means connected to said comparator output to discontinue application of second timing signals to said averaging means during the time duration of a reject signal.

11. The system of claim 7 in which there is provided additional averaging means connected to an output of said absolute value means and to said timing signal applying means and switchable (1) to an averaging state upon application of a second timing signal for averaging the values of said absolute deviation signals and (2) to a hold state for storing the resultant averaged deviation signals thereby to provide a mean deviation signal corresponding to the trend of the deviation of said process values from an average value.

12. An on-line instrumentation system for a process for providing the average of a plurality of values of a single process variable with said process values being sensed at differing and unevenly spaced times comprising means for sensing said process values and for generating corresponding spaced analog signals each of which is a direct function of a respective process value, read and hold means connected to said sensing means and switchable (1) to a read state to produce measured value signals each proportional in value to a corresponding analog signal upon application of a first timing signal and (2) to a hold state to store said measured signal upon termination of a first timing signal, averaging means connected to an output of said read and hold means and switchable (1) to an averaging state upon application of a second timing signal for averaging the values of said stored measured signals to produce a resultant running averaged value signal and (2) to a hold state for storing said resultant averaged signal upon termination of a second timing signal, timing means for producing for each process value sensing (1) a first timing signal each occurring during and of less time duration than the time of said sensing of a process value and (2) second timing signals each beginning no earlier than the termination of a corresponding first timing signal and having a time duration no longer than the smallest interval between sensing of process values, means for applying said first timing signals to said read and hold means whereby said measured signal is produced during a time duration less than the time of said sensing of a process value and said measured signal is stored until the next spaced process value is sensed, and means for applying said second timing signals to said averaging means whereby each of said stored measured signals is averaged for a predetermined constant time duration.

13. The instrumentation system of claim 12 in which there is provided absolute value means connected to said read and hold means and to said averaging means for providing the absolute value of the difference between (1) the value of each of said stored measured signals and (2) said resultant average value signal of said averaging means to produce an absolute deviation signal corresponding to the absolute value of the deviation of each process value from an average value.

14. The instrumentation system of claim 13 in which there is provided comparator means connected to said absolute value means for providing a reject signal when said absolute deviation signal is greater in magnitude than a selected reject level value indicating a corresponding process value is out of range.

15. The instrumentation system of claim 14 in which there is provided gate means connected to an output of said comparator means and to said second timing signal applying means for discontinuing application of second timing signals to said averaging means when a reject signal is produced by said comparator means thereby to prevent a measured value signal corresponding to an out of range process value from being averaged by said averaging means.

16. The system of claim 13 in which there is provided additional averaging means connected to an output of said absolute value means and to said second timing signal applying means and switchable (1) to an averaging state upon application of a second timing signal for averaging the values of said absolute deviation signals with each of said deviation signals being averaged for said predetermined constant time duration and (2) to a hold state for storing the resultant averaged deviation signals until the next deviation signal is averaged thereby to provide a mean deviation signal corresponding to the trend of the deviation of said process values from an average value.

References Cited

UNITED STATES PATENTS

| 3,017,026 | 1/1962 | Thompson | 209—121 |
| 3,053,332 | 9/1962 | Buchtenkirch et al. | 177—210 X |
| 3,063,635 | 11/1962 | Gordon | 235—151.33 |
| 3,274,377 | 9/1966 | Morison | 235—151.33 X |
| 3,351,837 | 11/1967 | Owen | 235—183 |
| 3,366,191 | 1/1968 | Reid et al. | 177—210 |
| 3,381,231 | 4/1968 | Gilbert | 235—183 X |

ARCHIE R. BORCHELT, Primary Examiner

C. M. LEEDOM, Assistant Examiner

U.S. Cl. X.R.

141—94; 209—121; 177—210; 235—183, 151.33